United States Patent [19]
Getzlaff et al.

[11] Patent Number: 5,634,047
[45] Date of Patent: May 27, 1997

[54] METHOD FOR EXECUTING BRANCH INSTRUCTIONS BY PROCESSING LOOP END CONDITIONS IN A SECOND PROCESSOR

[75] Inventors: Klaus J. Getzlaff, Schoenaich; Udo Wille, Holzgerlingen; Brigitte Roethe, Boeblingen; Wilhelm Haller, Remhshalden; Hans-Werner Tast, Weil im Schoenbush, all of Germany

[73] Assignee: International Business Machines Corporation, Armonk, N.Y.

[21] Appl. No.: 699,074

[22] Filed: Jun. 10, 1996

Related U.S. Application Data

[63] Continuation of Ser. No. 234,780, Apr. 28, 1994, abandoned.

[30] Foreign Application Priority Data

May 3, 1993 [EP] European Pat. Off. ............ 931071104

[51] Int. Cl.$^6$ ............................................. G06F 9/30
[52] U.S. Cl. ............................................... 395/588
[58] Field of Search ................................. 395/375, 588

[56] References Cited

U.S. PATENT DOCUMENTS

| | | |
|---|---|---|
| 4,062,058 | 12/1977 | Haynes . |
| 4,509,116 | 4/1985 | Lackey et al. . |
| 4,654,785 | 3/1987 | Nishiyama et al. . |
| 4,683,547 | 7/1987 | DeGroot . |
| 4,991,080 | 2/1991 | Emma et al. ........................ 395/375 |
| 5,070,475 | 12/1991 | Normoyle et al. . |
| 5,367,694 | 11/1994 | Ueno ................................. 395/375 |
| 5,421,020 | 5/1995 | Levitan .............................. 395/800 |

FOREIGN PATENT DOCUMENTS

| | | |
|---|---|---|
| 0211614 | 2/1987 | European Pat. Off. . |
| 0480095 | 4/1992 | European Pat. Off. . |
| 146342 | 8/1984 | Japan . |

OTHER PUBLICATIONS

IBM Technical Disclosure Bulletin vol. 32, No. 5B, Oct. 1989, "Repeating Microcode Words for Fast Controlled Repeat Cycle Functions", by Concha et al.
IBM Publication SA22-7201-0, "Enterprise Systems Architecture/390—Principles of Operation" Oct. 1990.
EPO Search Report dated Oct. 15, 1993.

*Primary Examiner*—Richard L. Ellis
*Attorney, Agent, or Firm*—Arthur J. Samodovitz

[57] ABSTRACT

A method and system for executing branch or other instructions in a loop. A loop end condition is evaluated in a fixed point unit while floating point instructions are evaluated in a floating point unit. In a first execution of the instructions in the loop, the loop end condition is processed as in prior art. A branch target instruction is stored in a branch target register and an instruction address of the branch target instruction is stored in a branch address register. However, on subsequent execution of the instructions in the loop, the branch condition is evaluated and, if it is fulfilled, once the end of the loop is detected by comparison of the effective address of the next instruction to be executed with the contents of the branch address register, the effective address of the first instruction in the loop is passed from the branch target register to an operations register.

15 Claims, 6 Drawing Sheets

| CYCLE | 1 | 2 | 3 | 4 | 5 | 6 | 7 | 8 | 9 |
|---|---|---|---|---|---|---|---|---|---|
| 400 IAR MOD (EFF) | A ✗ | B ✗ | BXLE ✗ | NSI ✗ | | TGI ✗ | TGI+1 ✗ | ✗ | ✗ |
| 410 OPERATION REG 1 | ✗ | A ✗ | B ✗ | BXLE ✗ | | DC ✗ | TGI ✗ | TGI+1 ✗ | ✗ |
| 420 OPERATION REG 2 | ✗ | ✗ | A ✗ | B ✗ | BXLE ✗ | | NOP ✗ | TGI ✗ | TGI+1 ✗ |
| 430 READ GPR | | | | R1,R3 | R3ODD | | | | |
| 440 OPERAND REG A,B | ✗ | ✗ | ✗ | ✗ | R1,R3 ✗ | SUM,R3ODD ✗ | ✗ | ✗ | |
| 450 WRITE GPR | | | | | | S= R1(SUM) | | | |
| 460 ALU | | | | | S= R1+R3 | S=R3ODD | | | |
| 470 SUCC BRANCH COND SFB | | | | | | ▬ | | | |
| 480 I-BUF LOAD | | | | | | 1 | 2 | | |
| 490 ADDRESS GENERATION | | | | | ▬ | | | | |

FIG. 4A

| CYCLE | 1 | 2 | 3 | 4 | 5 | 6 | 7 | 8 | 9 |
|---|---|---|---|---|---|---|---|---|---|
| 500 IAR MOD (EFF) | A ✗ | B ✗ | BXLE ✗ | NSI ✗ | | NSI+1 ✗ | NSI+2 ✗ | ✗ | ✗ |
| 510 OPERATION REG 1 | ✗ | A ✗ | B ✗ | BXLE ✗ | | NSI ✗ | NSI+1 ✗ | NSI+2 ✗ | ✗ |
| 520 OPERATION REG 2 | ✗ | ✗ | A ✗ | B ✗ | BXLE ✗ | | NSI ✗ | NSI+1 ✗ | NSI+2 ✗ |
| 530 READ GPR | | | | R1,R3 | R3ODD | | | | |
| 540 OPERAND REG A,B | ✗ | ✗ | ✗ | ✗ | R1,R3 ✗ | SUM,R3ODD ✗ | ✗ | ✗ | |
| 550 WRITE GPR | | | | | | S= R1(SUM) | | | |
| 560 ALU | | | | | S= R1+R3 | S=R3ODD | | | |
| 570 SUCC BRANCH COND SFB | | | | | | - - - - | | | |

FIG. 4B

| CYCLE | 1 | 2 | 3 | 4 | 5 | 6 | 7 | 8 | 9 | 10 | 11 |
|---|---|---|---|---|---|---|---|---|---|---|---|
| IAR MOD (EFF) 600 | ×F1 | ×F2 | ×F3 | ×F4 | ×BXLE | ×NSI | | ×F1 | ×F2 | ×F3 | ×F4 |
| OPERATION REG 1 605 | × | ×F1 | ×F2 | ×F3 | ×F4 | ×BXLE | | ×DC | ×F1 | ×F2 | ×F3 |
| OPERATION REG 2 610 | × | × | ×F1 | ×F2 | ×F3 | ×F4 | BXLE | ×NOP | ×F1 | ×F2 | |
| BRANCH ADDR REG 615 | × | × | × | × | × | × | × | BXLE | | | |
| BRANCH TGT REG 620 | × | × | × | × | × | × | × | × | F1 | | |
| SFB LT 625 | | | | | | | | | ▬▬▬ | ▬▬▬ | |
| SUCC BRANCH COND SFB 630 | | | | | | | | ▬▬▬ | | | ▬▬▬ |
| BRANCH LOOP COND 635 | | | | | | | | | | | |
| BRANCH A1 LT 640 | | | | | | | | | ▬▬▬ | | |
| BRANCH A2 LT 645 | | | | | | | | | | ▬▬▬ | |
| BRANCH B2 LT 650 | | | | | | | | | | | |
| READ GPR 655 | | | | | | R1,R3 | R30DD | | R1,R3 | R30DD | |
| WRITE GPR 660 | | | | | | | | S | | | |
| ALU 665 | | | | | | S=R1+R3 | S−R30DD | | R1+R3 | S−R30DD | |
| I-BUF LOAD 670 | | | | | | | 1 | 2 | | | |
| IAR MODE BRANCH ADR 675 | | | | | | | | | | | |

FIG. 5A

| CYCLE | 1 | 2 | 3 | 4 | 5 | 6 | 7 | 8 | 9 |
|---|---|---|---|---|---|---|---|---|---|
| 600 IAR MOD (EFF) | F4 | F1 | F2 | F3 | F4 | F1 | F2 | F3 | F4 |
| 605 OPERATION REG 1 | | F4 | F1 | F2 | F3 | F4 | F1 | F2 | F3 |
| 610 OPERATION REG 2 | | | F4 | F1 | F2 | F3 | F4 | F1 | F2 |
| 615 BRANCH ADDR REG | BRANCH | | | | | | | | |
| 620 BRANCH TGI REG | F1 | | | | | | | | |
| 625 SFB LT | | | | | | | | | |
| 630 SUCC BRANCH COND SFB | | | ——— | | | ——— | | ——— | |
| 635 BRANCH LOOP COND | | ——— | | | | ——— | | | |
| 640 BRANCH A1 LT | | | ——— | | | | ——— | | |
| 645 BRANCH A2 LT | | | | ——— | | | | ——— | |
| 650 BRANCH B2 LT | | | ——— | | | | ——— | | |
| 655 READ GPR | | | R1,R3 | R30DD | | | R1,R3 | R30DD | |
| 660 WRITE GPR | | | | S=R1+R3 | | | | R1 | |
| 665 ALU | S-R30DD | | R1+R3 | S-R30DD | | | R1+R3 | S=R1+R3 | S-R30DD |
| 670 I-BUF LOAD | | | | | | | | | |
| 675 IAR MODE BRANCH ADR | | ——— | | | | ——— | | | |

METHOD FOR EXECUTING BRANCH INSTRUCTIONS BY PROCESSING LOOP END CONDITIONS IN A SECOND PROCESSOR

The application is a continuation of application Ser. No. 08/234,780, filed Apr. 28, 1994, now abandoned.

BACKGROUND OF THE INVENTION

The invention relates generally to computer systems and deals more particularly with an improved technique for executing branch instructions.

In a computer program, branch instructions are encountered frequently and are executed in various ways. U.S. Pat. No. 5,070,475 to Normoyle et al discloses a data processing system which includes a floating point computation unit (FPU) which interfaces with a central processing unit (CPU). The CPU supplies a dispatch control signal to inform the FPU that it is about to execute a floating point microinstruction and supplies a dispatch address which includes the starting address of the floating point microinstructions during the same operating cycle that the dispatch control signal is supplied. A buffer memory is provided in the FPU to store the starting address of one decoded macroinstruction while a sequence of microinstructions for a previously decoded macroinstruction is being executed by the FPU.

U.S. Pat. No. 5,070,475 also discloses interface logic which handles suitable control signals for permitting asynchronous operation of the FPU and the CPU and which utilizes a single level of pipelining macroinstructions for initiating FPU operations. Suitable control signals are used in order to permit the transfer of FPU instruction information and to arrange for the proper loading and subsequent use thereof by the FPU. Further control is required to assure that the CPU does not transfer an FPU instruction when the single buffer pipeline at the FPU is full and unable to accept the FPU instruction.

U.S. Pat. No. 5,070,475 also discloses control signals which provide for the transfer of data in either direction between the CPU data bus and the FPU data bus. Moreover, other control signals are provided for handling floating point faults which may occur during the calculations being executed by the FPU.

U.S. Pat. No. 4,509,116 to Lackey et al. discloses an interconnection arrangement between a CPU and an FPU (called a "special instruction processor"). The CPU retrieves all of the microinstructions from the memory in series and decodes the instruction. An image of the instruction is passed to the FPU. When an instruction is received which requires processing by the FPU, then the CPU retrieves the data words comprising the operand from the memory and passes them to the FPU. After receiving the instruction, the FPU also decodes the instruction and proceeds to receive the data words comprising the operand of the instruction. The FPU then processes the operand in a conventional manner and prepares to transmit back to the CPU the results of the processing, i.e. the processed data and any condition codes. When the CPU is signalled by the FPU that it has finished processing, it signals the FPU to transmit the data. The CPU is then able to transmit the processed data back into storage in the memory.

U.S. Pat. No. 4,683,547 to DeGroot teaches a data processing system which includes a multiple floating point arithmetic unit with a putaway and a bypass bus. The FPU includes a new instruction for handling multiple multiply and divide instructions. These instructions include passing the results of each multiple/divide on a bypass bus to the input of an adder along with the inputs from an accumulate bypass bus which is the output from the adder for an automatic add operation on an accumulate multiply or accumulate divide operation. This allows two floating point results to be produced in each cycle, one of which can be accumulated without any intervening control by the CPU.

U.S. Pat. No. 4,654,785 to Nishiyama et al. discloses an information processing system having a plurality of arithmetic units such as a general instruction arithmetic unit or CPU and a floating point instruction arithmetic unit or FPU. The information processing system includes means provided for each of the arithmetic units which generates a condition code for use in branch judgement of a conditional branch instruction. Within each arithmetic unit, branch judgement means are provided which judge the success or failure of a branch of the conditional branch instruction by using the condition generated by the code generating means. A judgement unit decision circuit is also provided which is responsive to the operation state of each arithmetic unit for generating an instruction signal indicating which of the branch Judging means is to be operated to and supply the instruction signal to the branch judgement means, whereby branch control is carried out by using as a valid result either one of the branch judgement results obtained in the respective arithmetic units.

An article entitled "Repeating Microcode Words for Fast Controlled Repeat Cycle Functions", IBM Technical Disclosure Bulletin, vol 32, no 5B, October 1989, pp 403–404, teaches a repeat cycle enabling function in a microprogram controlled processor. In the disclosure, a microword control latch is set as each of the looping microcontrol words is being executed. This latch controls the gating of the microcontrol words into the control register. If the latch is ON, the control word clocked into the control register at the beginning of the next cycle will be from the output of the current control register. If the latch is OFF, the control word clocked into the control register at the beginning of the next cycle will be the output of the control storage.

An article entitled "Zero-cycle Branches in simple RISC Designs", IBM Technical Disclosure Bulletin, vol 33, no 10B, March 1991, pp 253–259, teaches a method of reducing the pipeline delay in a RISC system by providing a branch execution unit which executes the branches without interrupting with or using standard fixed point instruction resources. The branch execution unit attempts to make branches all but invisible to the fixed-point and floating-point execution units. Software support is needed in order to allow the operation of the branch execution unit.

In high end machines, a number of methods are known in which the number of cycles required to carry out a branch instruction are reduced to either zero cycles or one cycle. In general, these allow the next branch cycle to be processed while previous instructions are being executed. Assuming that the previous instructions neither affect the fulfillment of the branch condition nor the generation of the address to which the microprogram Jumps, then the branch condition will be calculated and the address of the next instruction to be processed placed into the instruction buffer. Such implementations require a higher amount of computer power and extra circuitry to control the parallel data flows. In addition it may not be possible to provide downward compatibility with existing microcode sequences.

A general object of the present invention is to produce a more efficient method for the execution of branch or loop instructions.

SUMMARY OF THE INVENTION

The invention resides in a processor and a dependent co-processor in a computer system, wherein in one of the processors, instructions in the loop are processed while simultaneously in the other processor, a loop end condition is processed.

According to one feature of the invention, during the processing of the instructions in the loop, the index value for the branch instruction is calculated, the calculated index value is compared with a branch condition value, and if the branch condition value is equal to the calculated index value then a successful branch indicator latch is set. A set successful branch indicator latch indicates that the instructions in the loop are to be performed again. Otherwise the next instruction outside the loop is performed.

In a preferred embodiment of the invention, the co-processor is a floating point unit. Also, a first branch address register stores the address of branch instruction and a second branch address register stores the address of the target instruction to be carried out if the branch instruction condition is fulfilled. First and second auxiliary registers store the register numbers of the branch microcode instruction and first and second latches control the calculation of the branch condition.

BRIEF DESCRIPTION OF THE FIGURES

FIGS. 4a and 4b illustrates the execution of a BXLE branch instruction in the prior art.

FIGS. 5a, 5b, and 5c illustrates the execution of a BXLE branch instruction according to the present invention.

DETAILED DESCRIPTION OF THE PREFERRED EMBODIMENTS OF THE PRESENT INVENTION

Figure 1:
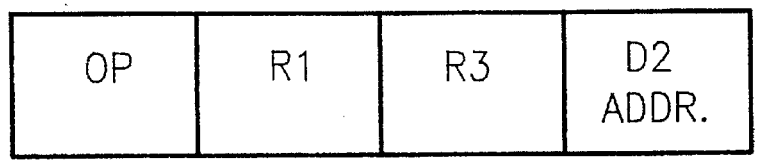
FIG. 1 illustrates the format of a prior art BXLE branch instruction.

Referring now to the Figures in detail wherein like reference numerals indicate like elements throughout the Figures, FIG. 1 illustrates a BXLE (Branch on Index Low or Equal) branch instruction known from the IBM System/390 microinstruction set. The BXLE has an operation code OP with the hexadecimal value '87'. It has two fields R1 and R3 and a branch address D2.

The BXLE instruction is described in detail in the "Enterprise Systems Architecture/390 Principles of Operation" (IBM Publications Number SA22-7201 available from Mechanicsburg, Pa.). The instruction adds an increment to a first operand which is stored in a register whose address is given in the field R1 and then compares the sum with a compare value. The result of this comparison determines whether or not branching occurs. Subsequently, the sum is placed at the location of the first operand (i.e. in the register whose address is given in the field R1). The address stored in field D2 is the address to which branching occurs. For BXLE, when the sum is low or equal to the compare value, the next instruction address in the current PSW is replaced by the branch address in field D2.

When the value in the R3 field is even, it designates a pair of registers; the contents of the even and odd registers of the pair are used as the increment and the compare value respectively. When the value in the R3 field is odd, it designates a single register, the contents of which are used as both the increment and the compare value.

A typical program loop which uses the BXLE instruction would be one in which the products of vectors are calculated. Such a program could contain the following instructions:

| | | |
|---|---|---|
| L1: | LDR | load R2 > R1 |
| | MD | R1 * Cache Operand > R1 |
| | AD | R1 + Cache Operand > R1 |
| | STD | Store R1 > Cache |
| | BXLE | Increment and Compare, branch to L1 if not fulfilled |

In this excerpt from a typical program, the value stored in a register R2 is loaded into the register R1 as indicated by the LDR instruction. This requires one cycle. The value in the register R1 is multiplied by a value in the cache and stored in the R1 register as given by the MD instruction. This requires another cycle. The value in register R1 is then added to the value in the cache and placed in register R1, as given by the AD instruction. This requires one cycle. The value in the register R1 is then stored in the cache, as given by the STD instruction. This requires a further cycle. Finally the BXLE instruction is executed. As explained below in connection with FIGS. 4a and 4b, this requires, in prior art systems, three cycles if the branching operation is carried out, otherwise only two cycles.

Figure 2:
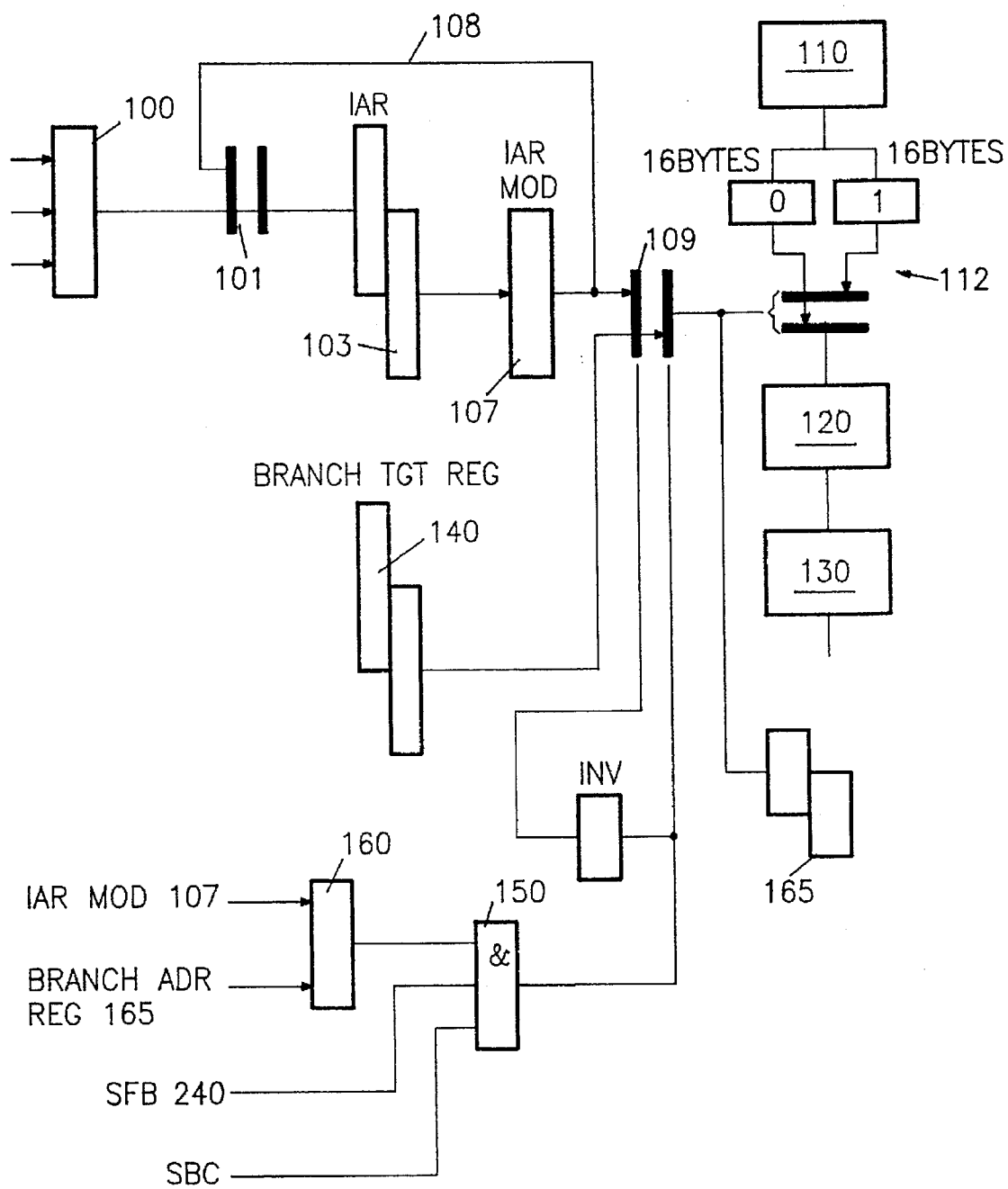
FIG. 2 illustrates a circuit used for calculating the address of the next instruction to be executed.

FIG. 2 shows the hardware used to generate the address of the instruction to be executed. In address generator 100, the target address of an instruction in the program is generated, e.g. by a branch instruction such as BXLE, and is passed to an instruction address register (IAR) 103 through a multiplexer 101. The target address is passed to an instruction buffer selector 112 which selects the addressed instruction out of the instruction buffer 110. The instruction buffer 110 is connected to a first operations register 120 and in turn to a second operations register 130.

During execution of the instruction, the IAR modifier 107 addresses the next sequential instruction of the program. The IAR modifier 107 is a network which allows the calculation of this instruction. The output of the IAR modifier is connected to the instruction address register 103 through line 108 and the multiplexer 101.

The output of the IAR modifier (IAR Mod) 107 is connected to the instruction buffer 110 through a multiplexer 109. The other input to the multiplexer 109 is connected to a branch target register 140 which stores the address of the first instruction in a program loop as will be described below. This address is generated from the field D2 of the branch instruction.

The multiplexer 109 is controlled by a signal from an AND gate 150. The AND gate 150 has three inputs. One input is from a successful branch (SFB) condition latch SFB 240, another input is a successful loop condition signal SBC, the third input comes from the output of an address comparator 160. The address comparator 160 compares the address in the IAR modifier (IAR Mod) 107 with the address in a branch address register 165 and produces a signal if the two addresses are identical.

Figure 3:
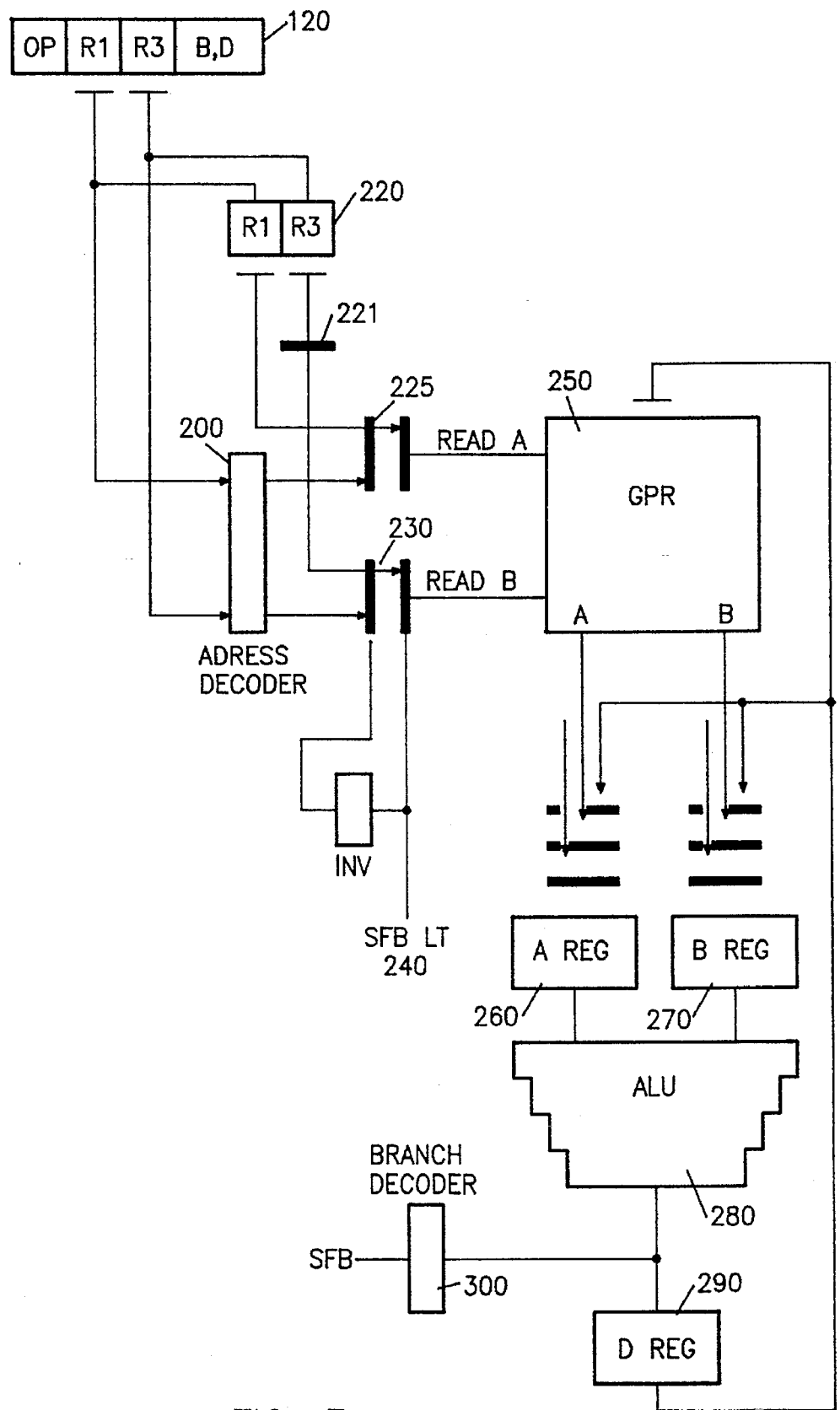
FIG. 3 illustrates data flow in the present invention and the addressing mechanism of a general purpose register.

FIG. 3 shows the data flow in one embodiment of the present invention. The first operations register 120 is connected to a supplementary register 220 which stores and decodes the address of the registers given by the R1 and R3 fields of the BXLE instruction. The first operations register 120 is also connected to an address decoder 200. The address decoder 200 decodes the address in a general purpose register file 250 of the registers given by the R1 and R3 fields of the BXLE instruction.

Both the address decoder 200 and supplementary register 220 are connected to multiplexers 225 and 230 which are controlled by a signal from the successful branch (SFB) condition latch 240. The multiplexers 225 and 230 are so controlled that they pass the decoded addresses in the address decoder 200 when the successful branch (SFB) condition latch 240 is not set, otherwise they pass the decoded addresses stored in the supplementary register 220.

The multiplexer 225 passes the value of the address stored in the R1 field of the BXLE instruction to the general purpose register file 250. The value stored in this address is passed to an A register 260 of an arithmetic and logic unit 280. The multiplexer 230 passes the value of the address stored in the R3 field of the BXLE instruction to the general purpose register file 250. The value stored in this address is passed to a B register 270 of the arithmetic and logic unit 280.

Connected to the arithmetic and logic unit 280 is a D register 290 which stores the output of the arithmetic and logic unit 280 and passes the output to either the A register 260, the B register 270 and/or the general purpose register file 250. Also connected to the output of the arithmetic and logic unit 280 is a branch decoder 300 which produces a successful branch condition SFB signal if the conditions for a branch instruction are met as will be described below.

The processing of the BXLE instruction in the prior art will now be described with the help of FIGS. 4A and 4B. Crosses in the Figs. indicate at which point in the cycle the action is carried out. Thick horizontal bars in the FIGS. 4A and 4B indicate during which periods a signal or data is valid.

In the first cycle of operation, the address of the instruction A from the IAR modifier 107 is taken from the output of the multiplexer 109 and is passed to the instruction buffer 110 (lines 400, 500).

In the second cycle of operation, the address of the next instruction B to be executed is calculated and placed at the output of the multiplexer 109 (lines 400, 500). The new address is also put into the instruction address register (IAR) 103. The instruction A is loaded into the first operations register 120 from the instruction buffer 110 (lines 410, 510).

In the third cycle of operation, the address in the instruction buffer 110 of the next instruction to be executed is calculated and placed at the output of multiplexer 109 (lines 400, 500). In this example, this next instruction is the branch instruction BXLE. It could, of course, be any branch instruction. The instruction A is passed from the first operations register 120, to the second operations register 130 (lines 420, 520) and the instruction B is passed from the instruction buffer 110 into the first operations register 120 (lines 410, 510).

The instructions A and B in the first operations register 120 and the second operations register 130 are decoded and executed as is well known in the prior art.

In the fourth cycle of operation, the BXLE instruction is passed from the instruction buffer 110 into the first operations register 120 where it is decoded and executed (lines 410, 510).

Decoding and execution of the BXLE instruction is carried out as known in the prior art. The contents of the R1 and R3 fields are passed to the address decoder 200 which decodes the addresses of the registers in the general purpose register file 250 in which the values of the first operand, increment value and compare value are stored. The decoded addresses are passed through the multiplexers to the general purpose register file 250 where a read operation is carried out (lines 430, 530).

In the fifth cycle of operation the BXLE instruction is passed from the first operations register 120 to the second operations register 130 (lines 420, 520). However, the BXLE instruction also remains in the first operations register 120 as it requires at least two cycles for its completion. In the IAR modifier 107, the address is calculated for the next instruction (NSI) to be carried out on completion of the loop operation. The address generator 100 calculates the target address to be prepared if the branch condition is successful (line 490). The contents of the registers in the general purpose register 250 indicated by the addresses stored in the R1 and R3 fields, i.e. the first operand and the increment value, are read into the A register 260 and the B register 270 (lines 440, 540). In the arithmetic and logic unit 280 the contents of the A register 260 and B register 270 are added together (lines 460, 560). The value stored in the R3 field of the BXLE field is also used to address in the general purpose register file 250 the value in the odd register (lines 430, 530), i.e. the compare value, as explained above.

In the sixth cycle of operation, a different procedure is carried out depending on whether the branch condition is successful or not. In FIG. 4A, an example of a successful branch condition is shown, i.e. the loop operation continues. In this case, the sum (S) of the first operand and increment value, i.e. the value stored in the register indicated by the address in the R1 and in the even register indicated by the R3 field is written into the general purpose register file 250 (line 450) and also into the A register 260 (line 440). The contents of the odd register indicated by the address stored in the field R3 in the BXLE instruction is read into the B register 270 (line 440).

In the arithmetic and logic unit 280, the contents of the odd register indicated by the address in the field R3 of the BXLE instruction is subtracted from the sum of the values of the contents of the registers indicated by the values of the field R3 and R1 (line 460). If this value is positive or zero then the branch condition is fulfilled, a successful branch condition signal (SFB) is issued (line 470) and the value of the address in the D2 field of the BXLE instruction is passed to the IAR modifier 107 to indicate the address of the target instruction (TGI) (line 400).

If, however, as is shown in FIG. 4b, the value in the arithmetic and logic unit 280 is negative, then the branch condition is not fulfilled (line 560). No successful branch condition signal is issued (indicated by dotted line; line 570). The next instruction (NSI) is passed into the first operations register 120 (line 510) where it is decoded and execution begun.

Comparing FIGS. 4a and 4b, it is seen that from the point at which the BXLE instruction is passed into the first operations register 120 until the point at which a next, non-branch instruction is passed to the first operations register requires either three cycles (FIG. 4a) if the branch condition is successful or two cycles (FIG. 4b) if it is not successful. The successful completion of the BXLE requires a wait cycle in cycle 7 in the second operations register 130 as is shown by the no operation (NOP) instruction (line 420).

The processing of a branch instruction according to the invention will now be described. Let us suppose now that the program comprises a loop containing a series of four instructions F1 to F4 which are implemented in a floating point unit, followed by a BXLE instruction. Such a set of instructions are typical of a vector operation. Of course, the loop could in real life be much longer than this. The loop is executed n times.

Figure 5C:
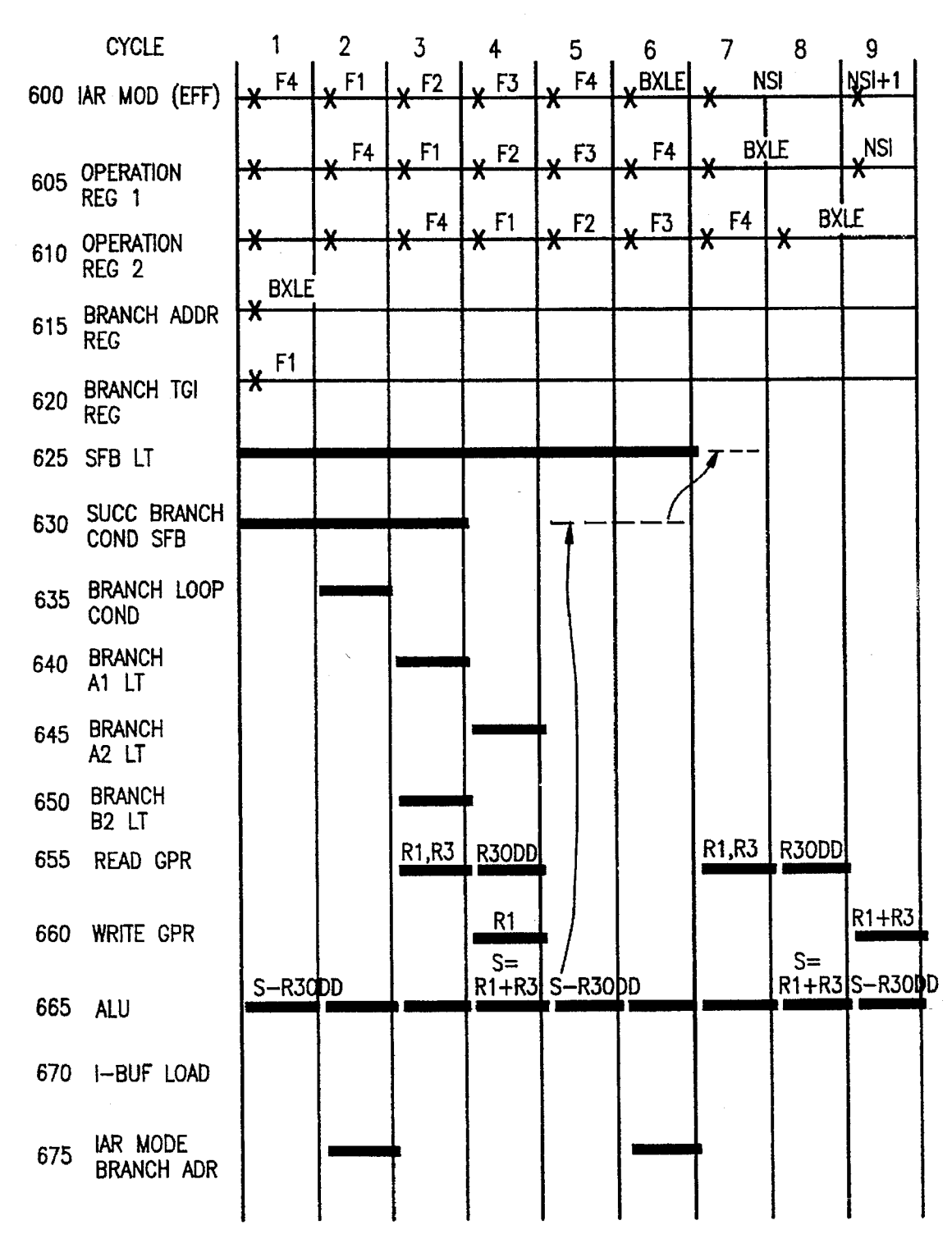

FIG. 5a shows the first pass of the loop. As was described in connection with FIGS. 4a and 4b, IAR modifier 107 calculates the address in the instruction buffer 110 in which the instructions are to be found (line 600). The instructions are passed from the instruction buffer 110 to the first operations register 120 to the second operations register 130 in successive cycles as is shown in lines 605 and 610. For simplicity only the instructions F1 to F4 and BXLE are shown in the FIGS. 5a to 5c. On FIGS. 5a to 5c, the lines which correspond to one another are given the same number.

In the sixth cycle of the first loop (FIG. 5a), the BXLE instruction is passed to the first operations register 120 (line 605), in the seventh cycle it is passed to the second operations register 130 (line 610) and in the eighth cycle the branch condition is evaluated (line 665) as was described in connection with FIGS. 4a and 4b. In the first loop, the branch condition is successful and a successful branch condition signal (SFB) issued (line 630) which, in the subsequent cycle, sets the successful branch (SFB) latch 240. The successful branch latch 240 remains set until it is reset as will be described later in connection with FIG. 5c.

The successful branch condition signal (SFB) will also store the target address to which is branched (i.e. the address indicated in the D2 field of the BXLE instruction) in the branch target register 140. In addition the address of the registers given in the R1 and R3 fields of the BXLE instruction are stored in the supplementary register 220. The address of the branch instruction itself will be stored in the branch address register 165.

The successful branch condition signal (SFB) also sets in the ninth cycle the branch A1 latch (line 640) which in turn sets, in the tenth cycle, the branch A2 latch (line 645). The branch A1 latch and the branch A2 latch remain set for only one cycle each as is shown in FIGS. 5a-5c.

FIG. 5b illustrates the further passes, from pass 2 to pass n−1 (i.e. penultimate pass) in the loop. In these passes, the floating point instructions F1 to F4 are passed directly from the first operations register 120 and second operations register 130 to the floating point unit where they are executed (lines 600 to 610).

Parallel to the execution of the floating point instructions F1 to F4 in the floating point unit, the branch condition is calculated in the fixed point unit as will be now described.

As shown in third cycle of FIG. 5b and described above, the successful branch condition signal sets the branch A1 latch (line 640). This is an equivalent step to the ninth cycle of FIG. 5a. The branch A1 latch causes the values from registers indicated in R1 and R3 which are stored in the supplementary register 220 to be read from the general purpose register file 250 (line 655) into the A register 260 or the B register 270. This is controlled by the multiplexers 225 and 230 which are switched by a signal from the successful branch latch 240. The successful branch condition signal (SFB) sets a branch B2 latch (line 650).

In the fourth cycle of FIG. 5b, the sum (S) of the first operand stored in the general purpose register file 250 at the address given in the R1 field of the BXLE instruction and the increment value stored in the general purpose register file 250 at the address given in the R3 field of the BXLE instruction is calculated in the arithmetic and logic unit 280 (line 665) and it is then written back into either the A register 260 or the B register 270. The value in the general purpose register 250 at the address given by the odd part of R3 of the BXLE command is read into the other one of the A register 260 or the B register 270. The address is obtained from the supplementary 220 and is controlled by the multiplexer 221 which is triggered when the branch A2 latch is active (line 645).

In the fifth cycle of FIG. 5b, the branch condition is again checked (line 665) and, as long as it is still fulfilled, the successful branch latch 240 will remain set (line 625).

The end of the loop is determined by looking at the address of the instruction in the IAR modifier 107 and seeing whether this is the same as the address of the last instruction in the loop, i.e. the address of the BXLE instruction. As was noted above, the address of the last instruction in the loop is stored in the branch address register 165. The comparison is made in the address comparator 160 shown in FIG. 2. If the two addresses instructions are equal, then a signal is produced (line 675) and instead of the address of the BXLE instruction being passed to the instruction buffer so that the BXLE instruction is read into the first operation register 120, the address of the first instruction in the loop F1 is read out of the branch target register 140 and passed to the instruction buffer. The multiplexer 109 is controlled by a signal from the AND gate 150 as described above.

The successful branch condition signal (SFB) also sets the branch B2 latch. This latch controls the writing of the calculated sum (S) of the first operand and the increment value into the general purpose register file 250 at the address indicated by R1 of the BXLE instruction.

FIG. 5c illustrates the final progression through the loop of the floating point instructions F1 through F4. The calculations in the first to fourth cycles of FIG. 5c proceed as described above. In the fifth cycle, the branch condition is not fulfilled (line 665). In this case, the successful branch condition signal (SFB) is not issued (line 630) and, as a result, the successful branch condition latch 240 is not set (line 625). Dotted lines on FIG. 5c indicate absence of the signal. As a result of this, no signal will be issued from the AND gate latch 150 to the multiplexer 109 and the branch instruction BXLE will be passed from the instruction buffer 110 to the first operations register 120 (line 605). The branch condition will then be evaluated in the prior art fashion and, as it is not fulfilled, the next instruction NSI read from the IAR modifier 107 into the first operations register 120 from the instruction buffer and executed as was described above.

Using the apparatus of the current invention, one can reduce the effective time required for the evaluation of the branch condition from three cycles to zero cycles. This is achieved by performing the calculations relevant to the branch condition in the fixed point unit whilst the floating point unit calculations are performed in the floating point unit.

Based on the foregoing, apparatus and method for executing a branch or other loop instruction have been disclosed. However, numerous modifications and substitutions can be made without deviating from the scope of the present invention. Therefore, the invention has been disclosed by way of illustration and not limitation, and reference should be made to the following claims to determine the scope of the present invention.

We claim:

1. Method for executing a program comprising instructions in a loop, said method comprising the steps of:
   in a first processor, performing a first execution of said instructions and concurrently in a second processor, processing a loop end condition;
   storing a branch target address in a branch target register and storing an address of a branch instruction in a branch address register, said branch target address being an address of a first instruction in the loop;
   performing a subsequent execution of said instructions in said first processor, and while avoiding execution of said branch instruction, evaluation instead a branch condition in said first processor and, if the branch condition is fulfilled, detecting an end of the loop by comparing an effective address of a next instruction to be executed with contents of the stored address of the branch instruction;

passing the stored branch target address from said branch target register to said second processor for re-executing said instructions; and executing said instructions until the branch condition is no longer fulfilled, and then addressing a next instruction outside of said loop; and wherein said evaluating step comprises the steps of calculating an index value for the branch instruction, comparing the calculated index value with a branch condition value, and setting a successful branch indicator latch if the branch condition value is equal to the calculated index value; and said calculating step comprises the step of retrieving from an index register a previous value of the index value and adding to said previous value a value given in the branch instruction.

2. A method for executing a program utilizing a main processor, a co-processor, a general purpose register and a loop control means for processing loops of instructions including a branch instruction which specifies a loop index, an increment and a branch address and determines whether the loop has to be repeated or exited, said method comprising the steps of:

said main processor generating current addresses of said instructions and said co-processor concurrently executing said instructions;

separately storing address data of said index and said increment during a loop execution;

storing said branch address and an address of the branch instruction when during processing of a loop said branch instruction is first time executed;

storing a branch condition if during a first execution of the loop the branch instruction indicated that a branch condition is fulfilled, and maintaining said branch condition stored during all loop execution cycles until said loop control means indicates that the branch condition is no longer fulfilled;

updating said index while said loop is executed a next time in said co-processor, said generating at an end of said next loop execution a successful branch condition indication if the branch condition is still fulfilled, said successful branch condition indication confirming storage of said branch condition for a next loop cycle;

repeating step (e) as long as the branch condition is fulfilled;

comparing said branch instruction address and said current instruction address to determine when during execution of the loop said branch address has been reached; and replacing said current instruction address by said branch address if step (g) resulted in a match and step (e) or (f) resulted in a branch condition, thereby suppressing the execution of said branch instruction until the branch condition ceases to be fulfilled;

calculating an index value for the branch instruction;

comparing the calculated index value with a branch condition value;

setting a successful branch indicator latch if the branch condition value is equal to the calculated index value;

executing again the loop instructions if the successful branch indicator latch is set, otherwise jumping to a next instruction outside the loop to be executed; and retrieving from an index register a previous value of the index value and adding to the previous value a value given in the branch instruction; and wherein said branch instruction is a branch or index low or equal instruction.

3. A computer system including main processor for performing address modification, a co-processor for executing loop instructions and a general purpose register, said system comprising:

loop control means for processing loops of instructions including a branch instruction which specifies a loop index, an increment and a branch address and determines whether the loop has to be repeated or exited;

instruction address modifier means for generating a current instruction address during execution of a loop;

first register means for storing address data of said index and said increment during the loop execution;

second register means for storing said branch address and an address of the branch instruction when during a loop processing said branch instruction is first time executed;

branch latch means which are set if during a first execution of the loop the branch instruction determined that the branch condition is fulfilled, where said branch latch means remains set during all loop execution cycles until said loop control means indicates that the branch condition is no longer fulfilled;

means for updating said index while the loop is executed in the co-processor, and generating at an end of a loop execution a successful branch condition signal if the branch condition is still fulfilled, said successful branch condition signal confirms the set status of said branch latch means;

means for comparing said branch instruction address and said current instruction address to indicate that during execution of the loop said branch address has been reached; and multiplexer means controlled by a match output of said comparing means, by the set status of said latch means and by said successful branch condition signal for replacing said current instruction address by said branch target address from said second register means and thereby suppressing the execution of said branch instruction until the branch condition ceases to be fulfilled; and wherein said first register means comprises a supplementary register for storing numbers of registers for said branch instruction, one of said registers containing an index and the other of said registers containing an increment.

4. The computer system according to claim 3, wherein said means for updating said index includes means for calculating an index value for the branch instruction and means for comparing the calculated index value with a branch condition value, wherein said comparing means controls the setting of said branch latch means if the branch condition is fulfilled.

5. The computer system according to claim 3, further comprising second and third latch means for controlling the calculation of the branch condition and the operation of said comparing means.

6. A method for processing loops of instructions including a branch instruction which specifies a loop index, an increment and a branch instruction address, said method comprising the steps of:

(a) in a first processor, generating a current instruction address during execution of a loop;

(b) separately storing address data of the index and the increment during execution of said loop;

(c) storing the branch instruction address and a branch target address when during loop processing said branch instruction is executed a first time;

(d) storing a branch condition if during a first execution of the loop the branch instruction indicates that a branch condition is fulfilled, and maintaining said stored branch condition during other execution(s) of said loop until the branch condition is no longer fulfilled;

(e) in a second processor, executing said loop a next time and concurrently modifying the current instruction address and evaluating the branch condition in said first processor by calculating an index value for the branch instruction using said separately stored address data and said separately stored increment and by comparing the calculated index value with a value of the branch condition and generating a successful branch condition indication if the branch condition value is equal to the calculated index value;

(f) repeating step (e) as long as the branch condition is fulfilled, and otherwise addressing and executing in said first processor a next instruction outside of the loop;

(g) during each performance of step (e), accessing the stored branch instruction address and comparing it with the modified current instruction address to determine when during execution of the loop said branch instruction address has been reached; and (h) replacing said current instruction address by said branch target address if step (g) resulted in a match and step (e) resulted in a successful branch condition, thereby suppressing execution of said branch instruction in said first processor until the branch condition ceases to be fulfilled.

7. A method according to claim 6 wherein said loop instruction controls mathematical operations.

8. A method according to claim 6 wherein said second processor is a floating point unit.

9. A method according to claim 6 wherein said branch instruction is a branch on index low or equal instruction.

10. A method according to claim 6 wherein step (e) comprises the steps of:

calculating an index value for the branch instruction by retrieving from an index register a previous value of the index value and adding to said previous value a value given in the branch instruction;

comparing the calculated index value with a branch condition value; and setting a successful branch indicator latch if the branch condition value is equal to the calculated index value.

11. A first processor for processing loops of instructions including a branch instruction which specifies a loop index, an increment and a branch instruction address, said first processor comprising:

means for generating a current instruction address during execution of a loop;

first register means for separately storing address data of the index and said increment during execution of said loop;

second register means for storing the branch instruction address and a branch target address when during loop processing said branch instruction is executed a first time;

latch means for storing a branch condition if during a first execution of the loop the branch instruction indicates that the branch condition is fulfilled, and maintaining said stored branch condition during other execution(s) of said loop until said loop control means indicates that the branch condition is no longer fulfilled;

means for modifying the current instruction address and evaluating the branch condition while said loop is executed a next time in a second processor, by calculating an index value for the branch instruction using the contents of said first register means, said separately stored address data and said separately stored increment and by comparing the calculated index value with a value of the branch condition and generating a successful branch condition indication if the branch condition value is equal to the calculated index value;

means for repeating operation of the modifying and evaluating means as long as the branch condition is fulfilled, and otherwise addressing and executing in said first processor a next instruction outside of the loop;

means for comparing during each operation of the modifying and evaluating means, said branch instruction address stored in said second register means and the modified current instruction address to determine when during execution of the loop said branch instruction address has been reached; and means for replacing said modified current instruction address in said modifying means by said branch target address if the comparing means indicates a match and the operation of the modifying and evaluating means resulted in a branch condition, thereby suppressing execution of said branch instruction in the first processor until the branch condition ceases to be fulfilled.

12. The processor according to claim 11, wherein said first register means comprises supplementary registers storing the register numbers of said branch instruction, one of said supplementary registers containing said index and the other of said supplementary registers containing said increment.

13. The processor according to claim 11, wherein said means for modifying the instruction address and for evaluating the branch condition includes means for calculating an index value for the branch instruction and means for comparing the calculated index value with a value of the branch condition, wherein said comparing means directs the setting of said branch latch means if the branch condition is fulfilled.

14. The processor according to claim 11, wherein said latch means comprises second and third latches to control the calculation of the branch condition and the operation of said comparing means.

15. Method for executing a program comprising instructions in a loop, said method comprising the steps of:

in a first processor, performing a first execution of said loop instructions and concurrently in a second processor, processing a loop end condition;

storing a branch target address of a first instruction in the loop and storing an address of a branch instruction;

performing a subsequent execution of said loop instructions in said first processor, and while avoiding execution of said branch instruction, evaluating instead a branch condition in said first processor and, if the branch condition is fulfilled, detecting an end of said loop by comparing an effective address of a next instruction to be executed with the stored address of the branch instruction;

passing the stored branch target address to said second processor for re-executing said instructions; and executing said loop instructions until the branch condition is no longer fulfilled, and then addressing a next instruction outside of said loop; and wherein said evaluating step comprises the steps of calculating an index value for the branch instruction, comparing the calculated index value with a branch condition value, and setting a successful branch indicator latch if the branch condition value is equal to the calculated index value; and said calculating step comprises the step of retrieving a previous value of the index value and adding to said previous value a value given in the branch instruction.

* * * * *